(12) United States Patent
Qiu et al.

(10) Patent No.: US 12,318,340 B2
(45) Date of Patent: *Jun. 3, 2025

(54) CONTROL LINK FOR ADULT TOY OPERATION AND METHOD FOR USING THE SAME

(71) Applicant: HYTTO PTE. LTD, Singapore (SG)

(72) Inventors: Jilin Qiu, Guangdong (CN); Dan Liu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,047

(22) Filed: Aug. 15, 2024

(65) Prior Publication Data
US 2025/0009594 A1     Jan. 9, 2025

Related U.S. Application Data

(63) Continuation of application No. 18/351,390, filed on Jul. 12, 2023, which is a continuation of application No. 17/714,278, filed on Apr. 6, 2022, now Pat. No. 11,737,948.

(51) Int. Cl.
| | |
|---|---|
| *A61H 19/00* | (2006.01) |
| *H04L 67/125* | (2022.01) |
| *G06Q 50/00* | (2012.01) |
| *H04L 9/40* | (2022.01) |

(52) U.S. Cl.
CPC .......... *A61H 19/00* (2013.01); *H04L 67/125* (2013.01); *G06Q 50/01* (2013.01); *H04L 63/0236* (2013.01); *H04L 2209/56* (2013.01); *H04L 2209/80* (2013.01)

(58) Field of Classification Search
CPC .............................. A61H 19/00; H04L 67/125
See application file for complete search history.

(56) References Cited

U.S. PATENT DOCUMENTS

| | | |
|---|---|---|
| 9,762,515 B1 | 9/2017 | Olivares et al. |
| 10,335,572 B1 | 7/2019 | Kumar |
| 10,492,981 B1 | 12/2019 | Kumar |
| 10,685,488 B1 | 6/2020 | Kumar |
| 11,737,948 B1 * | 8/2023 | Qiu ........................ A61H 23/02 600/38 |
| 2001/0027472 A1 | 10/2001 | Guan |
| 2015/0310446 A1 | 10/2015 | Tuchman et al. |
| 2023/0072423 A1 | 3/2023 | Osborn et al. |

FOREIGN PATENT DOCUMENTS

WO      2017189017 A1    11/2017

* cited by examiner

*Primary Examiner* — Oleg Korsak
(74) *Attorney, Agent, or Firm* — Holtz, Holtz & Volek PC

(57) ABSTRACT

A system for remotely controlling a sexual stimulation device includes a sexual stimulation device configured to perform an operational mode in accordance with a received signal. A memory device has stored thereon a set of instructions. A processor is configured to execute said set of instructions to generate a control link for activating the operational mode of the sexual stimulation device, post the generated control link to a social platform, website, or application, receive an operational instruction from a user over a computer network via the control link, and initiate the operational mode of the sexual stimulation device in accordance with the received operational instruction.

20 Claims, 9 Drawing Sheets

CONTROL LINK FOR ADULT TOY OPERATION AND METHOD FOR USING THE SAME

CROSS REFERENCE TO RELATED APPLICATIONS

This application is a continuation application of U.S. patent application Ser. No. 18/351,390, filed Jul. 12, 2023, which is a continuation application of U.S. patent application Ser. No. 17/714,278, filed Apr. 6, 2022, and issued as U.S. Pat. No. 11,739,948 on Aug. 29, 2023.

TECHNICAL FIELD

The present disclosure relates to a control link and, more specifically, a control link for adult toy operation and a method for using the same.

DISCUSSION OF THE RELATED ART

Adult toys are devices designed for sexual stimulation of a user. Adult toys may be able to produce a wide range of movements, referred to herein as "operational modes." These operational modes can provide sexual stimulus by various movements such as vibrations and other repetitive movements.

Traditionally, a user has been responsible for manually activating the adult toy device and switching between its many operational modes. More recently, adult toys have been designed that allow for remote control over a computer network such as the Internet to allow a remote user to control the operational modes of the adult toy being used by a local user.

SUMMARY

A system for remotely controlling a sexual stimulation device includes a sexual stimulation device configured to perform an operational mode in accordance with a received signal. A memory device has stored thereon a set of instructions. A processor is configured to execute said set of instructions to generate a control link for activating the operational mode of the sexual stimulation device, post the generated control link to a social platform, website, or application, receive an operational instruction from a user over a computer network via the control link, and initiate the operational mode of the sexual stimulation device in accordance with the received operational instruction.

The processor may be further configured to execute said set of instructions to receive a financial transaction instruction over the computer network via the control link, and initiate a financial transaction in accordance with the received financial transaction instruction.

The processor may be further configured to execute said set of instructions to add an additional control option to the control link upon a completion of the financial transaction.

The processor may be further configured to execute said set of instructions to generate the control link in response to a received command of a content creator.

The received command of the content creator may be received via the social platform, the website, or the application.

The initiation of the operational mode of the sexual stimulation device may be performed by a terminal of a content creator. The computational device may be connected to the computer network via a network adapter and additionally connected to the sexual stimulation device over a short-range wireless communication link.

The control link may include information pertaining to the sexual stimulation device, including a device name, information pertaining to a content creator in possession of the sexual stimulation device, including a creator ID, and/or information pertaining to a duration of operability of the control link.

The control link may include a uniform resource locator (URL) for opening and displaying a control interface for initiating the operational mode of the sexual stimulation device.

The control interface may further allow for setting one or more operational parameters for the operating mode of the sexual stimulation device, the operational parameters including an amplitude of operation, a frequency of operation, an intensity of operation, and/or one or more predetermined parameter profiles.

A control interface may be provided to a content creator in possession of the sexual stimulation device to send text messages, emoticons, audio signals, video signals, or image data to the user of the control link on the social platform, the website, or the application.

The operational mode of the sexual stimulation device may include vibration, rotation, oscillation, movement of air, increase or decrease in air pressure, change in temperature, expansion, and/or contraction.

The control link may be configured to be shared within the social platform, the website, or the application, or shared within an additional social platform, an additional website, or an additional application.

A method for a remotely controlling a sexual stimulation device includes posting, to a social platform, website, or application, a control link for activating an operational mode of a sexual stimulation device. An operational instruction is received from a user over a computer network via the control link. An operational mode of the sexual stimulation device is initiated in accordance with the received operational instruction.

The control link may be hosted by a server that relays the operational instruction to a terminal that is in communication with the network and connected to the sexual stimulation device via a short-range wireless communication protocol.

The posting of the control link may be initiated by a content creator in possession of the sexual stimulation device.

The content creator may send a text message, an emoji, an audio signal, a video signal, or an image to the user over the computer network via a user interface of the control link.

The control link may include a uniform resource locator (URL) for opening and displaying a control interface for initiating the operational mode of the sexual stimulation device.

The control interface may further allow for setting one or more operational parameters for the operating mode of the sexual stimulation device, the operational parameters may include an amplitude of operation, a frequency of operation, an intensity of operation, and/or one or more predetermined parameter profiles.

The operational mode of the sexual stimulation device may include vibration, rotation, oscillation, movement of air, increase or decrease in air pressure, change in temperature, expansion, and/or contraction.

The control link may be shared within the social platform, the website, or the application, or shared within an additional social platform, an additional website, or an additional application.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
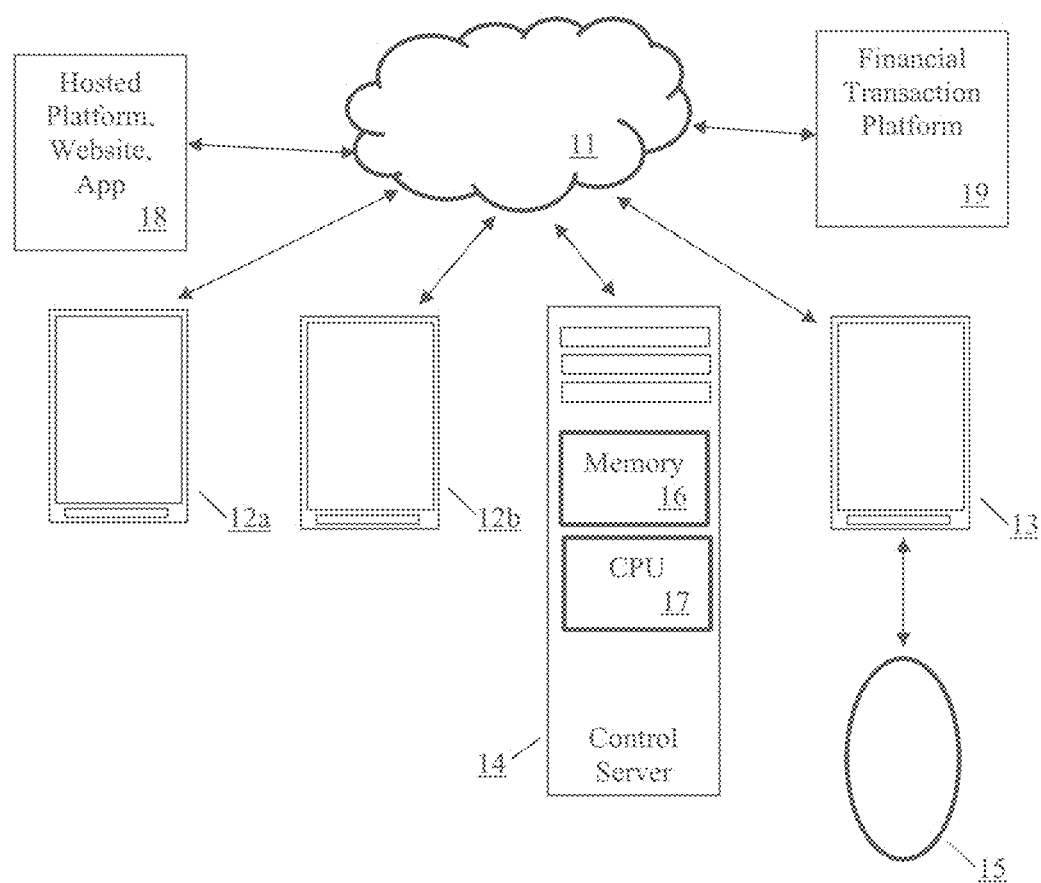
FIG. 1 is a schematic diagram illustrating a system for remotely controlling a sexual stimulation device in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide systems and methods for remotely controlling the operation of an adult toy over a computer network such as the Internet. According to various exemplary embodiments of the present invention, a Control Link may be used to help pass control of the operation of the adult toy from a first user in possession of the adult toy (referred to herein as a content creator or a local operator) to a second user (referred to herein as a user) who is remote with respect to the first user. The first user may be referred to herein as a content creator as this first user may be engaged in the creation of live-streaming and/or recorded audio/video for the purposes of intimacy with a particular partner or for the purposes of entertainment and/or education of others. The second user may accordingly be a person invited to remotely control the operation of the adult toy over a computer network, such as the Internet, by the receiving of the Control Link.

The Control Link may be instantiated as a control panel hosted as a web service on a server and represented by a URL that may be posted to a public, semi-private, or private social platform such as by text message or similar chat/messenger platform, such as a social media platform, such as an Internet forum, or on any other platform or communications protocol.

The content creator may create the Control Link via a local app, which may be an application running on the content creator's computer or mobile device. The content creator may be limited to creating only one live Control Link at a time, although each Control Link may be given an expiration time and may be manually ended prior to the established expiration time. Similarly, each Control Link may be limited to being accessed by only one user at a time and one user wishing to access the Control Link that is presently being accessed by another user may find the Control Link inactive.

The user, having received or otherwise viewed the URL, may select the URL via a web browser or mobile application and may thereby gain access to controlling the operation of the adult toy. The user may receive the URL from a computer or mobile device and the URL may either lead to the establishment of a web browser connection or may trigger an installed app on the user's computer or mobile device to display the connection. If the requisite app is not already installed, the user's computer may automatically open an application repository (e.g., app store) so as to acquire the requisite app. This app may be referred to herein as a "remote app" as it may facilitate the remote operation of the adult toy.

In addition to facilitating the remote operation of the adult toy, the Control Link may facilitate communication between the user and the content creator by acting as a client for a messaging or audio/video conferencing service. The Control Link may also facilitate operation of a financial transaction by acting as a client for a financial services provider, for example, to facilitate tipping from the user to the content creator.

The Control Link may provide operational control of the adult toy to the user by establishing a real-time connection between a terminal of the user and a terminal of the content creator in which the content creator is provided with an option to join the real-time connection. The content creator may create the Control Link for a limited time after which the Control Link may expire and might no longer be operational. The content creator may post the Control Link to a social platform where it might be discoverable to the user. Alternatively, the content creator may send the Control Link directly to the user as a text message or private message on a social platform.

In generating the Control Link, the content creator may activate a control user interface that the content creator may use to join or reject the real-time connection that is established when the user engages the Control Link. Upon the joining of the real-time connection by both parties, the user may gain access to a control user interface that may be used to control the operational mode of the adult toy. The operational modes of the adult toy may provide sexual stimulation to the content creator.

Multiple adult toys may also be connected to the content creator's terminal and as such, the Control Link may extend control to the user to control the operational modes of each of the adult toys connected to the content creator's terminal, for example, via Bluetooth.

FIG. 1 is a schematic diagram illustrating a system for remotely controlling a sexual stimulation device in accordance with exemplary embodiments of the present invention. A content creator may operate a content creator terminal 13, which may be a stationary device such as a desktop computer or teleconferencing console or a mobile device such a laptop/notebook personal computer (PC), a tablet computer, or a smartphone device. The content creator terminal 13 may establish a local (e.g., short range) wired or wireless connection with an adult toy 15, for example, via Bluetooth. The content creator terminal 13 may also be in communication with a computer network 11, such as the Internet, via a network adapter of the content creator terminal 13. This connection may be a wired connection, for example, via Ethernet, or may be a wireless connection, for example, via WiFi or a cellular network (e.g., a 4G or 5G cellular network).

The content creator terminal 13 may interact with a control server 14 via the computer network 11. The control server 14 may be instantiated as one or more computer devices that are remotely accessible over the computer network 11, with each of said devices including a memory 16, a CPU 17, and any other hardware needed to operate properly, such as a storage element for the storage of computer software to implement the approaches described herein. The content creator may use this connection to engage the control server 14 to generate a Control Link. The content creator may then post the generated Control Link to one or more hosted platforms, websites, apps, etc. 18 such as a social media platform, a messaging platform, etc. One or more users, each using a user console (e.g., a first user console 12a and/or a second user console 12b), may access the one or more hosted platforms, websites, apps, etc. 18 and gain access to the Control Link. A user may then activate the Control Link (i.e., by selecting/clicking, etc.) and the content creator terminal 13 may receive a request to establish a real-time connection with the user via the user terminal 12a/12b. Upon acceptance of the request by the content creator, a real-time connection may be established over the computer network 11. This real-time connection may be maintained by the control server 14 or the hosted platform, website App, etc. 18. Alternatively, the real-time connection may be maintained as a peer-to-peer connection between the user terminal 12a/12b and the content creator terminal 13.

During the pendency of the real-time connection, the user may control the operational modes of the adult toy 15 in real-time via the Control Link and more specifically, the control user interface provided by the control server 14 in response to the user engaging with the Control Link. Bidirectional textual communication, audio communication, and/or video communication may all be routed though the control user interface or one or more of these services may be provided outside of the control user interface. The real-time connection may be canceled at any time by the selection of either the user or the content creator and cancelation of the real-time connection may terminate remote control of the adult toy 15. Alternatively, remote control of the adult toy 15 may be paused, resumed, or canceled by the content creator without ending the real-time connection. The user may also use the Control Link to initiate a financial transaction as the Control Link may act as an interface to a financial transaction platform 19 that the user has a new or preexisting business relationship with. The financial transaction may include a transfer of money from the user to the content creator, for example, as a tip, and the Control Link may provide some confirmation to the user and/or the content creator that the financial transaction has been performed. The transfer of money may be a tip sent from the remote user to the content creator. The transfer of money may be in the form of a virtual currency such as a cryptocurrency, a token or credit.

Figure 2:
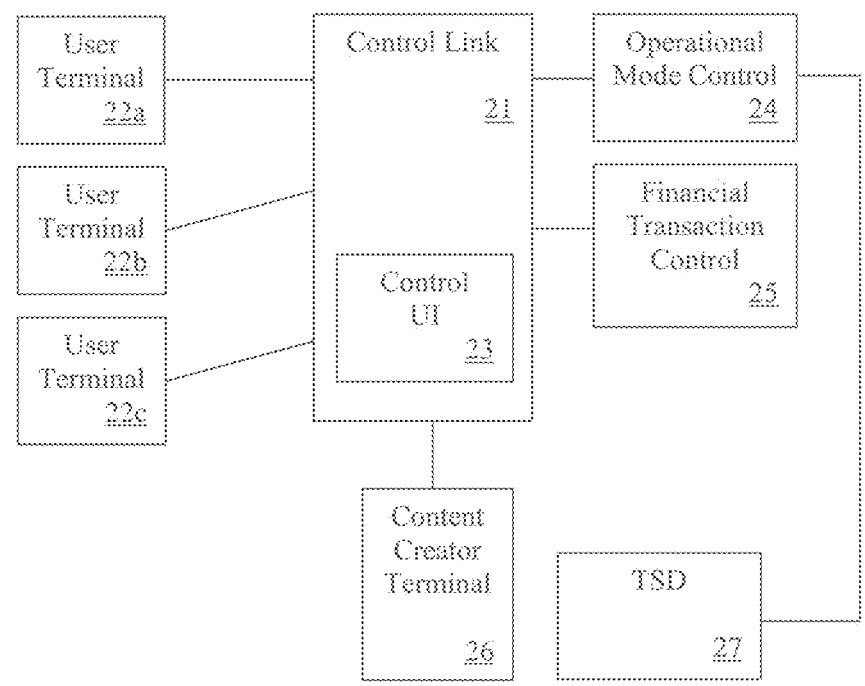
FIG. 2 is a schematic diagram illustrating an approach for connecting various software elements of a system for remotely controlling a sexual stimulation device in accordance with exemplary embodiments of the present invention.

FIG. 2 is a schematic diagram illustrating an approach for connecting various software elements of a system for remotely controlling a sexual stimulation device in accordance with exemplary embodiments of the present invention. The Control Link 21, as described above, may include a URL directing a user to a control user interface 23 that is hosted on a control server. One or more users may access the Control Link 21 via a corresponding user terminal 22a/22b/22c. The content creator may generate the Control Link 21 from a content creator terminal 26 and the content creator may similarly access the control UI 23 of the Control Link 21 via the content creator terminal. The control UI 23 may provide operational mode control of an adult toy in the possession of the content creator via an operational mode control 24 software element that may act as a hardware driver for sending the correct command codes to the adult toy, that may be a sexual stimulation device (TSD) 27. The control UI 23 of the control link 21 may similarly provide a capability to initiate a financial transaction by via a financial transaction control 25 software element that may act as an application program interface (API) to a financial services platform for the exchange of money between account holders.

It is noted that the content creator may access the control UI via the content creator's terminal and that the user may access the control UI (which may be the same control UI or a differentiated control UI) via the user's terminal. Each terminal may access the control UI either through a web interface via a standard web browser, through a specialized web interface via a browser with a plug-in or browser extension installed therein, or through a custom app available for download and installation or via an application repository such as an app store.

Figure 3:
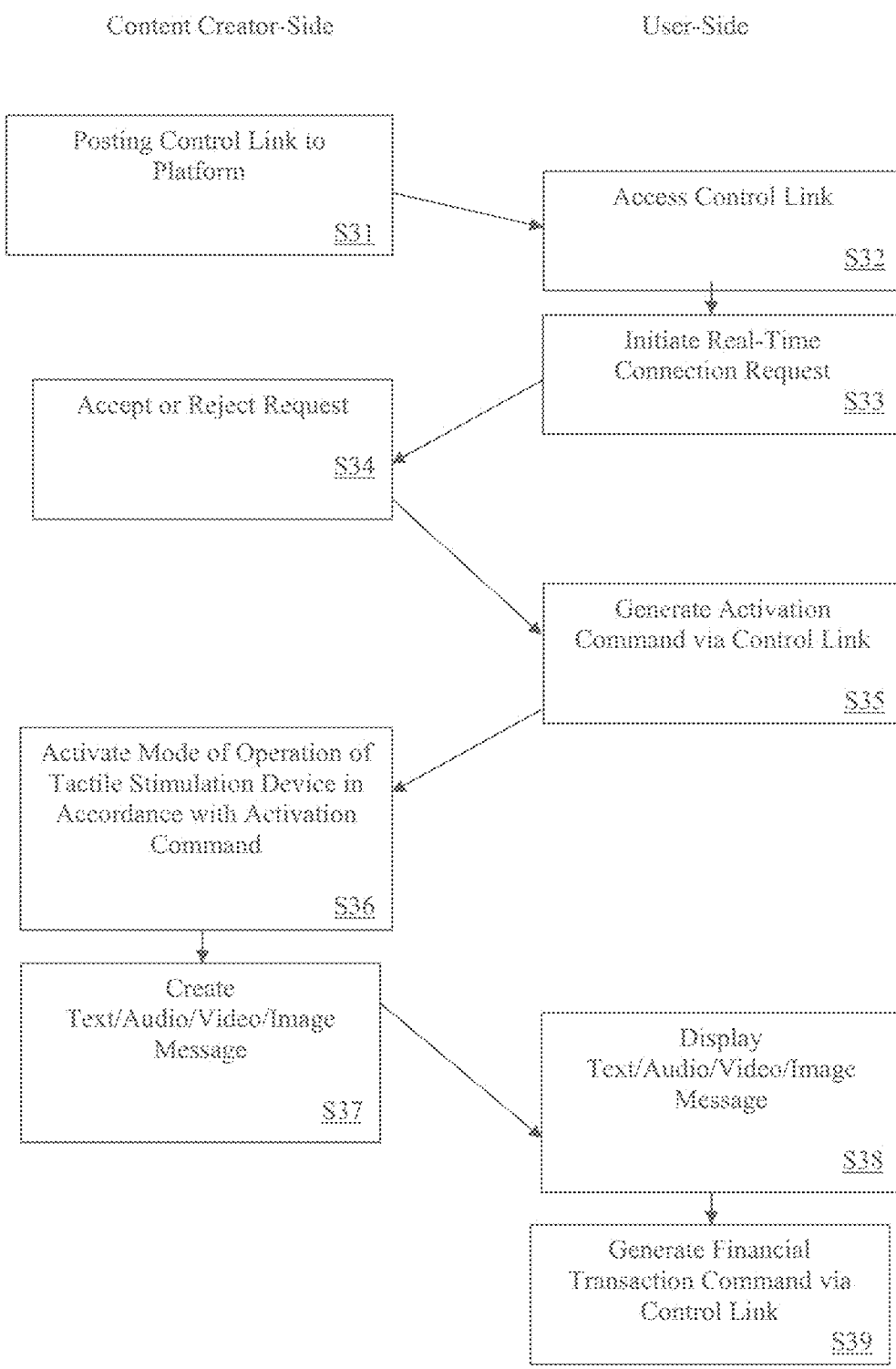
FIG. 3 is a flow chart illustrating an approach for operating a remote-controlled sexual stimulation device in accordance with exemplary embodiments of the present invention.

FIG. 3 is a flow chart illustrating an approach for operating a remote-controlled sexual stimulation device in accordance with exemplary embodiments of the present invention. At the content creator side, a Control Link may be generated and posted to a social platform, for example, as discussed above (Step S31). Then, at a user-side, a user may access the Control Link within the social platform (Step S32). The user may then utilize the Control Link to request a real-time connection (Step S33), provided that the Control Link has not yet expired and was not deactivated by the content creator. At the content creator-side, the content creator may receive the request and may accept or reject the request (Step S34) with the acceptance of the request leading to the establishment of the real-time connection. Once the real-time connection has been established, the user, at the user-side, may interact with the control UI of the Control Link to generate an activation command (Step S35). The activation command may be transmitted to the content creator-side where it may be received by the content creator terminal and a web interface or application running on the content creator terminal may send an instruction to the TSD connected to the content creator terminal, via Bluetooth, to activate the selected mode of operation (Step S36). The content creator may transmit textual messages, audio, still images, and/or video to the user (Step S37) via the control UI of the Control Link and the user, at the user-side, may display the received content, either in real-time or as images, clips, etc. (Step S38), for example, via the control UI of the Control Link. Also at the user side, the user may initiate a financial transaction, e.g., to transfer money to an account of the content creator, via the control UI of the Control Link (Step S39).

Figure 4:
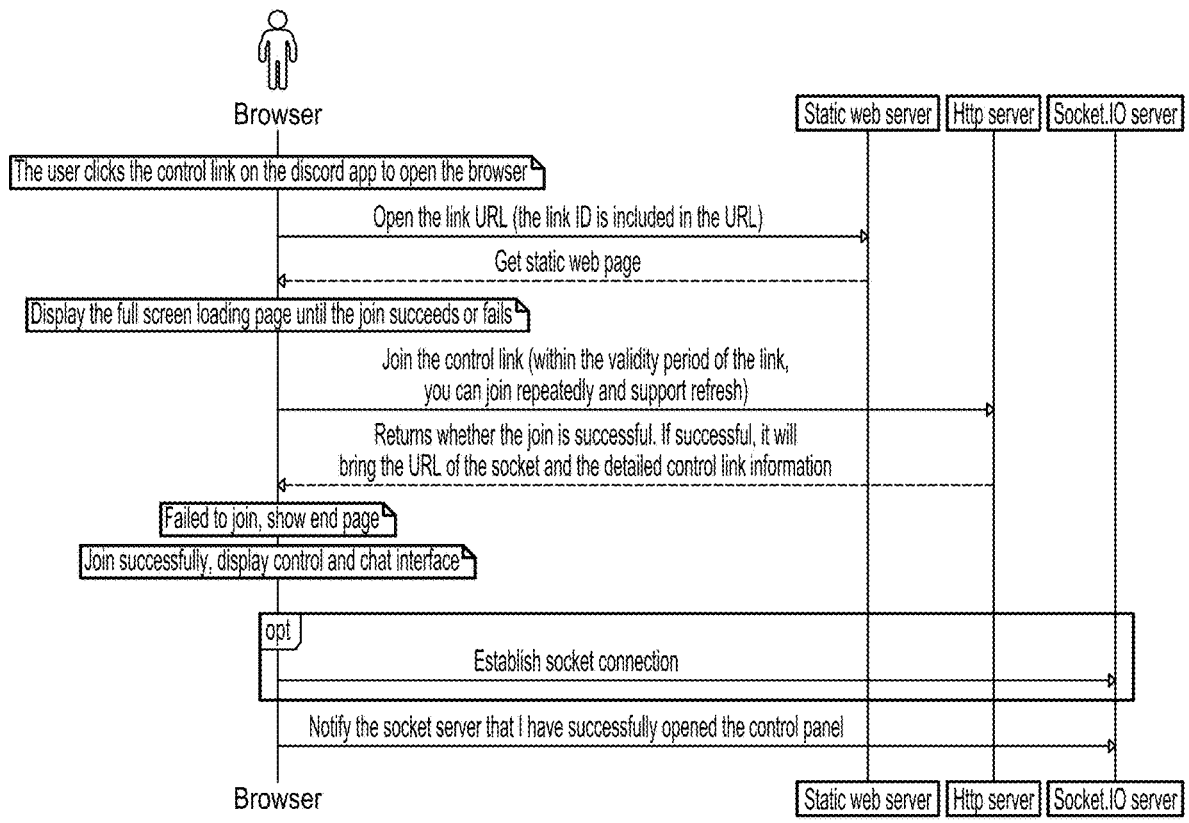
FIGS. 4-7 are flowcharts illustrating an approach for control link joining in accordance with exemplary embodiments of the present invention.

FIG. 4 is a flowchart illustrating an approach for control link joining in accordance with exemplary embodiments of the present invention. The user may access the Control Link via a browser (as depicted) or via an app. The user may click the control link, for example, that has been posted to a social media/communications/forum app and a browser or dedicated app may be launched to open the URL associated with the Control Link. A static web server may maintain the URL and may thus provide its contents to the user, which may include a static web page. The user terminal may then display a full screen loading page until the joining of the real-time connection either succeeds or fails. Assuming the Control Link is still valid and un-expired, a request may be sent to an HTTP server for the establishment of the real-time connection and the HTTP server may either establish the connection or fail. Either way, the status of the connection may be sent ack to the user terminal to inform the user as to whether the connection was successful or failed. Successful establishment of the connection may include establishing a socket connection between content creator and user via a socket.IO server. The socket server may be notified about the successful connection.

Figure 5:
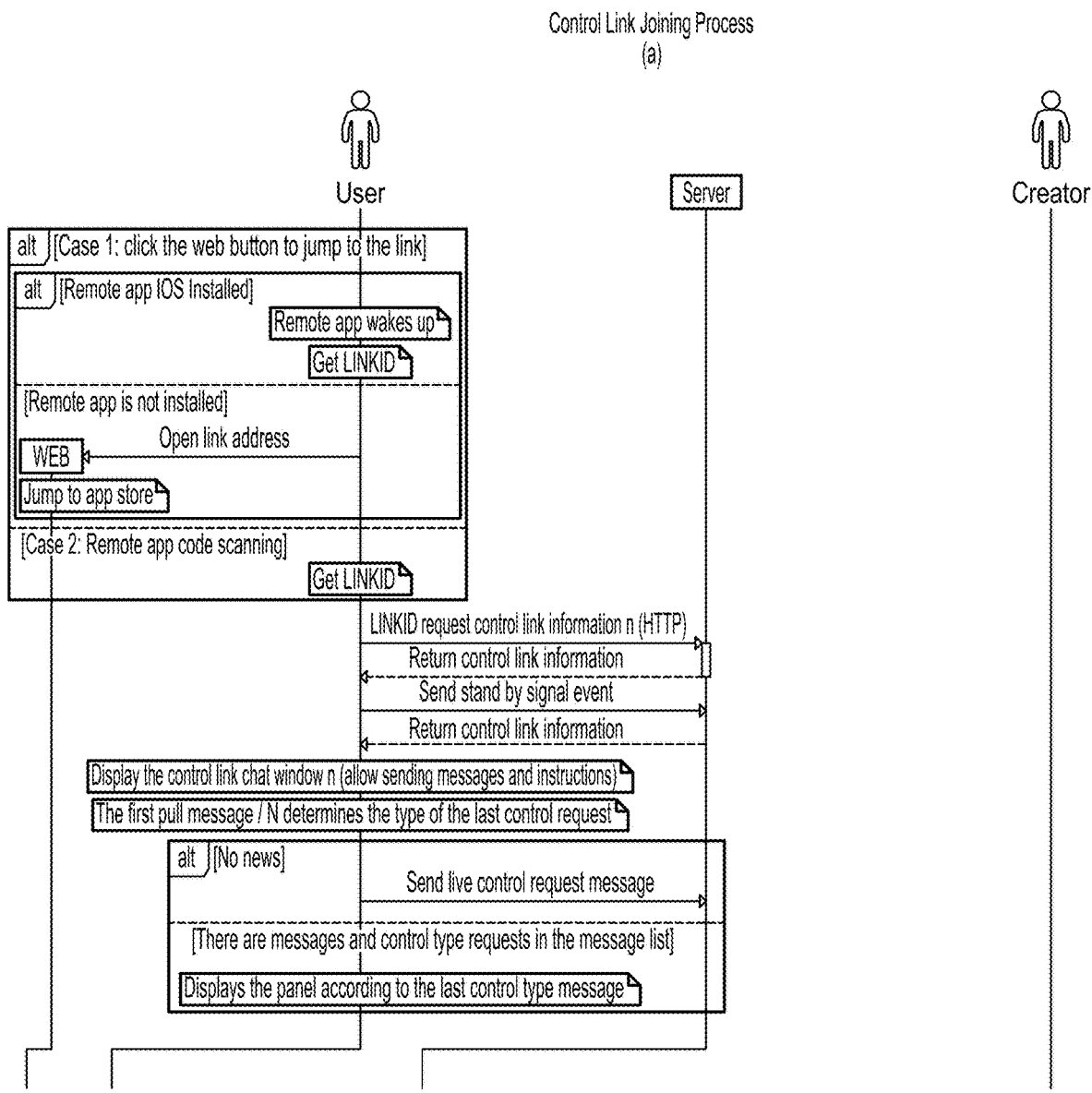
Figure 6:
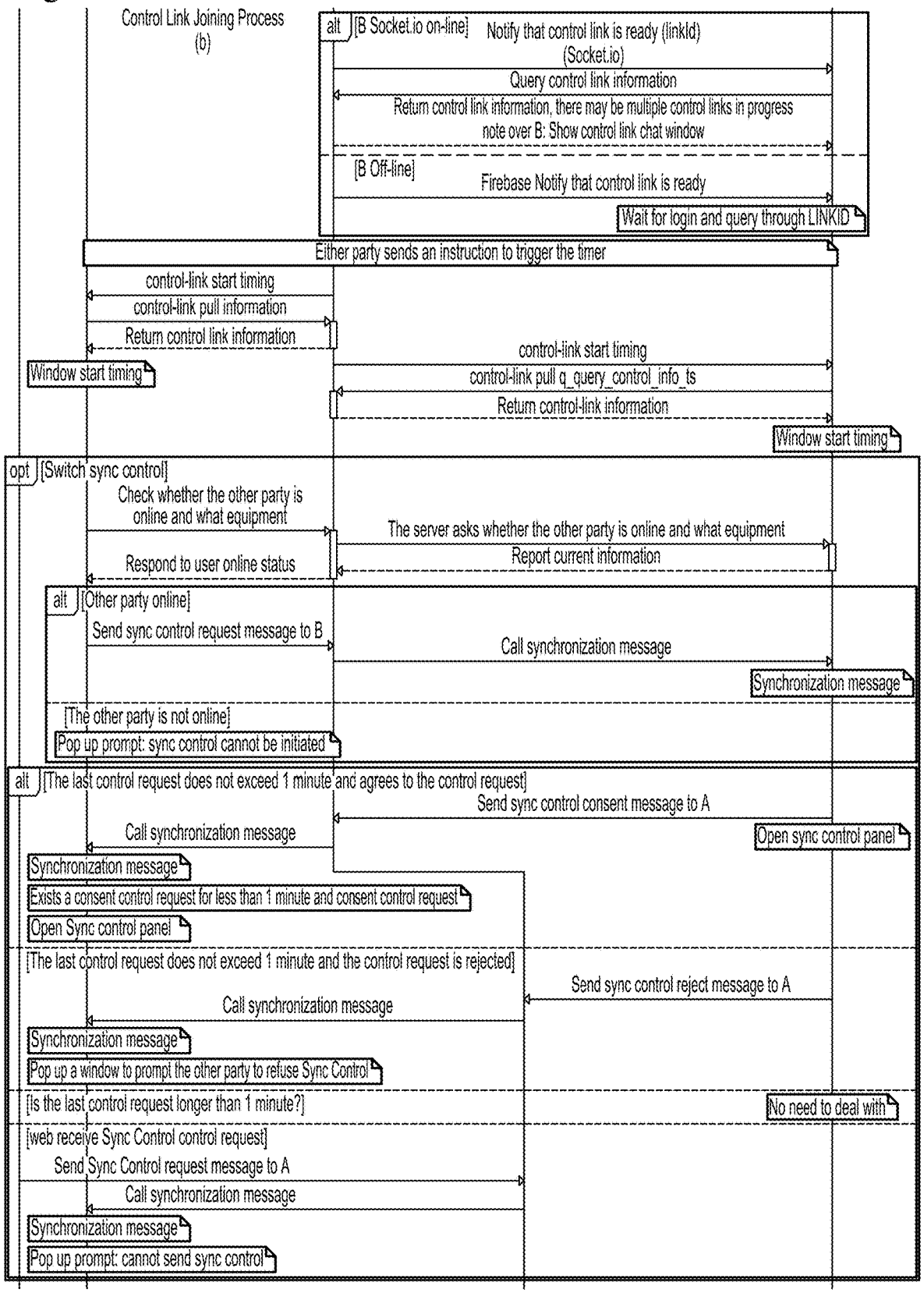
Figure 7:
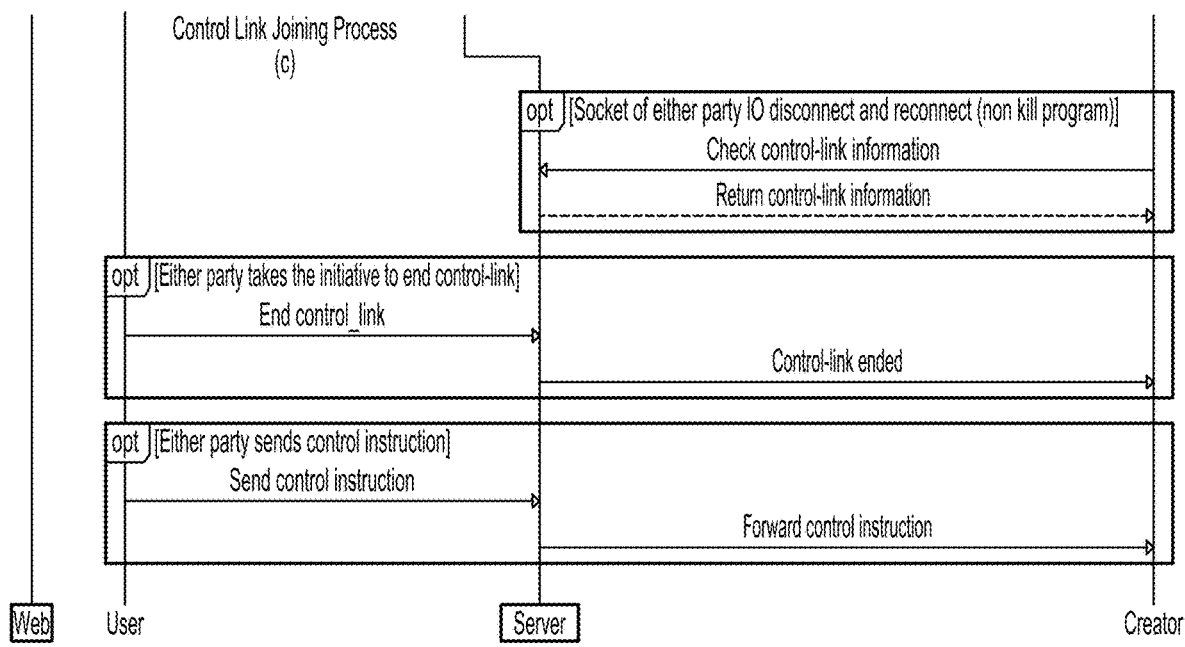

FIGS. 5-7 are flowcharts illustrating an approach for control link joining in accordance with exemplary embodiments of the present invention. In FIG. 5, section (a) of the process is shown. Here, the user can click on the Control Link and a remote app executing on the user terminal can be used to follow the link, or if the remote app is not installed on the client terminal, the client terminal may be directed to a website that initiates a jump to an application repository (e.g., an app store) so that the user terminal may download and install the remote app. Then the remote app may be used to move forward with accessing the Control Link. However, as an alternative, the Control Link may be accessed entirely with a web browser running on the user terminal.

The server may receive the HTTP request from the user's accessing of the Control Link and may return control link information. A Control Link chat window may then be displayed to the user and a live control request may then be sent to the server, with the chat link window and a control panel being displayed to the user. Then, as may be seen from section (b) of FIG. 6, the server may notify the content creator that the control link is ready and wait for the content creator to login, if not already done, and send the content creator the request, which if accepted, may lead to the server and user terminal negotiating connection and control in the manner shown. Then, as shown in section (c) of FIG. 7, either party may disconnect the socket connection in the manner shown.

Figure 8:
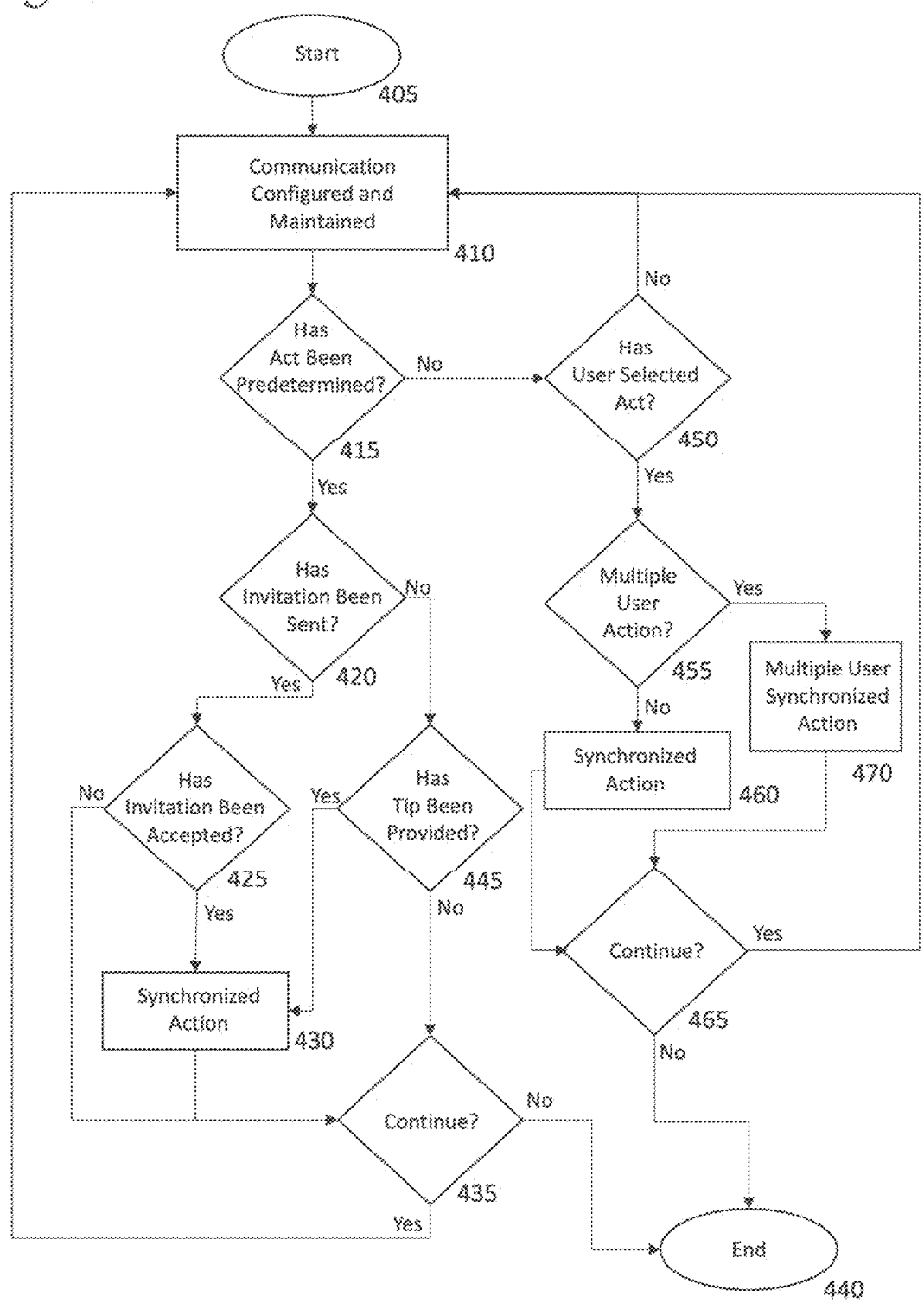
FIG. 8 is a flowchart illustrating an approach for operating an adult toy using a control link in accordance with exemplary embodiments of the present invention.

FIG. 8 is a flowchart illustrating an approach for operating an adult toy using a control link in accordance with exemplary embodiments of the present invention. As may be seen from this flowchart, the process may first start (Step 405). Thereafter, the Control Link may be used to establish and maintain a connection, for example, in the manner described above (Step 410). Next it is determined whether an operational mode (e.g., "act") of the TSD has been defined (step 415). If it has not been, then it is determined whether the user has selected an operational mode (Step 450). If no, then the user may do so using the Control Link configuration options (Step 410). If an operational mode of the TSD has been defined (Yes, Step 415) then it is determined whether an invitation has been sent (Step 420). If yes, then it is determined whether the invitation has been accepted by the content creator (Step 425). If it is determined that no invitation has been sent (No, Step 420) then it is determined whether a tip has been provided (Step 445). If no tip has been provided (No, Step 445) then whether to continue the method is determined (Step 435). If it is determined that the method will not continue (No, Step 435) that the method may end (Step 440). If it is determined that the method will continue (Yes, Step 435) then the process may continue from the Control Link user interface (Step 410).

If, however, the invitation has been accepted (Yes, Step 425) then synchronized action may be performed (Step S430) with synchronized action referring to the user's synchronized interaction with the content creator. Then it may be determined whether the method should continue (Step S435).

If, however, the user has selected an operational mode (Yes, Step 450), then it may be determined whether multiple user actions have been selected (Step S455). If so, then multiple user synchronized actions may be performed (Step S470) and it may be determined whether the method should continue (Step 465). If multiple user actions have not been selected (No, Step 455) then a single synchronized action may be performed and it may be determined whether the method should continue (Step 465). The synchronized actions may represent operational modes of the TSD. In either case, if it is determined that the method should continue (Yes, Step 465) then the process may continue from the Control Link user interface (Step 410), else the process will end (Step 440).

Figure 9:
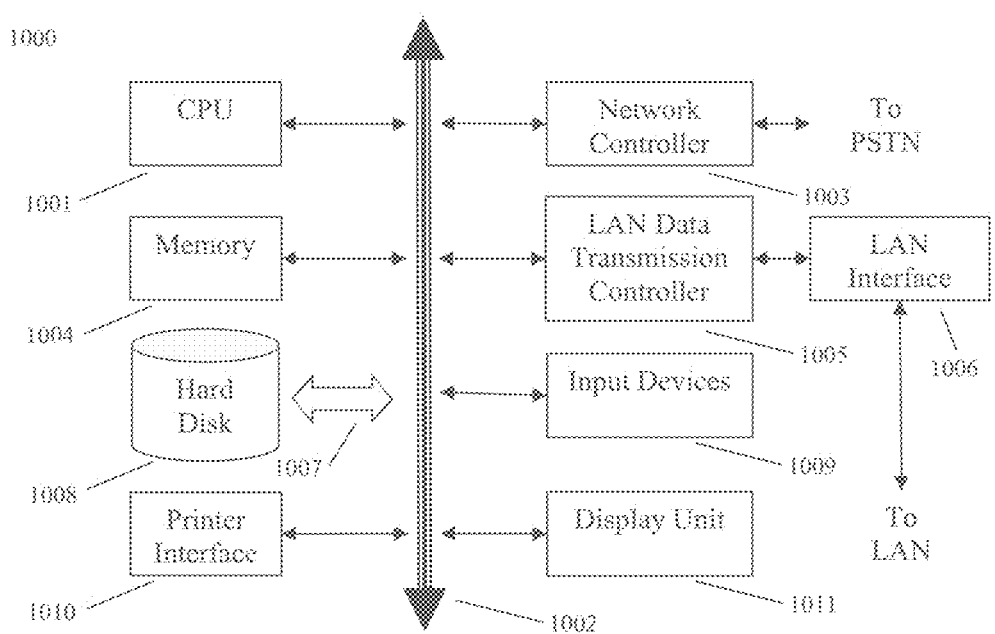
FIG. 9 shows an example of a computer system capable of implementing the method and apparatus according to embodiments of the present disclosure.

FIG. 9 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system for remotely controlling a sexual stimulation device, the system comprising:
 a processor; and
 a memory device having stored thereon a set of instructions which, when executed by the at least one processor, control the system to:
  establish a local connection between a terminal of a first user and a sexual stimulation device of the first user through an application installed on the terminal of the first user;
  send a request for generating a control link to a server from the application installed on the terminal of the first user;
  receive the control link from the server via the application installed on the terminal of the first user, the control link being generated and hosted by the server in response to the request sent thereto;

establish a real-time connection between the terminal of the first user and a terminal of a second user in response to the first user having relayed the control link and the second user having received and accessed the control link relayed by the first user;

obtain an activation command from the server hosting the control link, the activation command being generated in response to the second user interacting with a control user interface of the control link and being transmitted to the terminal of the first user, and the control user interface of the control link being activated in response to the second user accessing the control link; and send the activation command to the sexual stimulation device of the first user by the terminal of the first user, thereby activating and activate the sexual stimulation device to perform operate under an operational mode corresponding to the activation command.

2. The system of claim 1, wherein the set of instructions, when executed by the at least one processor, further control the system to establish a real-time connection between the terminal of the first user and the terminal of the second user in response to the first user having relayed the control link and the second user having received and accessed the control link relayed by the first user in a state in which the control link is valid and un-expired.

3. The system of claim 1, wherein the control link includes a uniform resource locator (URL) for opening and displaying a control interface for activating the operational mode of the sexual stimulation device.

4. The system of claim 3, wherein the URL of the control link is configured to be launched to open through at least one of a forum application, a browser application, and a dedicated application.

5. The system of claim 1, wherein:
the request for generating the control link is sent to the server which hosts the control link in response to the first user requesting to create the control link via the application installed on the terminal of the first user, and
the control link is returned to the application installed on the terminal of the first user from the server.

6. The system of claim 1, wherein the operational mode of the sexual stimulation device includes at least one of vibration, rotation, oscillation, movement of air, increase or decrease in air pressure, change in temperature, expansion, and contraction.

7. The system of claim 1, wherein the control link is shareable within at least one of a social platform, a website, and the application.

8. The system of claim 1, wherein the control link is configured to be valid for a limited time.

9. The system of claim 1, wherein the control link is configured to be limited to being accessed by only one user at a time.

10. A method for remotely controlling a sexual stimulation device, the method comprising:
establishing a local connection between a terminal of a first user and a sexual stimulation device of the first user through an application installed on the terminal of the first user;
sending a request for generating a control link to a server from the application installed on the terminal of the first user;
receiving the control link from the server via the application installed on the terminal of the first user, the control link being generated and hosted by the server in response to the request sent thereto;
establishing a real-time connection between the terminal of the first user and a terminal of a second user in response to the first user having relayed the control link and the second user having received and accessed the control link relayed by the first user;
obtaining an activation command from the server hosting the control link, the activation command being generated in response to the second user interacting with a control user interface of the control link and being transmitted to the terminal of the first user, and the control user interface of the control link being activated in response to the second user accessing the control link; and
sending the activation command to the sexual stimulation device of the first user by the terminal of the first user, thereby activating the sexual stimulation device to operate under an operational mode corresponding to the activation command.

11. The method of claim 10, further comprising establishing a real-time connection between the terminal of the first user and the terminal of the second user in response to the first user having relayed the control link and the second user having received and accessed the control link relayed by the first user in a state in which the control link is valid and un-expired.

12. The method of claim 10, wherein the control link includes a uniform resource locator (URL) for opening and displaying a control interface for activating the operational mode of the sexual stimulation device.

13. The method of claim 12, wherein the URL of the control link is configured to be launched to open through at least one of a forum application, a browser application, and a dedicated application.

14. The method of claim 10, wherein:
the request for generating the control link is sent to the server which hosts the control link in response to the first user requesting to create the control link via the application installed on the terminal of the first user, and
the control link is returned to the application installed on the terminal of the first user from the server.

15. The method of claim 10, wherein the operational mode of the sexual stimulation device includes at least one of vibration, rotation, oscillation, movement of air, increase or decrease in air pressure, change in temperature, expansion, and contraction.

16. The method of claim 10, wherein the control link is shareable within at least one of a social platform, a website, and the application.

17. The method of claim 10, wherein the control link is configured to be valid for a limited time.

18. The method of claim 10, wherein the control link is configured to be limited to being accessed by only one user at a time.

19. A non-transitory computer-readable storage medium storing computer-executable instructions that, when executed by at least a processor of an application server, control the application server to perform operations comprising:
establishing a local connection between a terminal of a first user and a sexual stimulation device of the first user through an application installed on the terminal of the first user;

sending a request for generating a control link to a server from the application installed on the terminal of the first user;

receiving the control link from the server via the application installed on the terminal of the first user, the control link being generated and hosted by the server in response to the request sent thereto;

establishing a real-time connection between the terminal of the first user and a terminal of a second user in response to the first user having relayed the control link and the second user having received and accessed the control link relayed by the first user;

obtaining an activation command from the server hosting the control link, the activation command being generated in response to the second user interacting with a control user interface of the control link and being transmitted to the terminal of the first user, and the control user interface of the control link being activated in response to the second user accessing the control link; and sending the activation command to the sexual stimulation device of the first user by the terminal of the first user, thereby activating the sexual stimulation device to operate under an operational mode corresponding to the activation command.

20. The non-transitory computer-readable storage medium of claim 19, wherein the control link includes a uniform resource locator (URL) for opening and displaying a control interface for activating the operational mode of the sexual stimulation device.

* * * * *